United States Patent
Wray (10) Patent No.: US 9,514,290 B2
(45) Date of Patent: Dec. 6, 2016

(54) AUTHORIZATION CACHE

(75) Inventor: Mike Wray, Somerset (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/371,665

(22) PCT Filed: Mar. 30, 2012

(86) PCT No.: PCT/US2012/031403
§ 371 (c)(1),
(2), (4) Date: Jul. 10, 2014

(87) PCT Pub. No.: WO2013/147838
PCT Pub. Date: Oct. 3, 2013

(65) Prior Publication Data
US 2014/0359720 A1 Dec. 4, 2014

(51) Int. Cl.
| *G06F 21/00* | (2013.01) |
| *G06F 21/30* | (2013.01) |
| *H04L 29/06* | (2006.01) |
| *G06F 21/62* | (2013.01) |

(52) U.S. Cl.
CPC ........... *G06F 21/30* (2013.01); *G06F 21/6227* (2013.01); *H04L 63/10* (2013.01)

(58) Field of Classification Search
CPC ...... G06F 21/30; G06F 21/00; G06F 21/6227; H04L 63/10
USPC .......................................................... 726/4
See application file for complete search history.

(56) References Cited

U.S. PATENT DOCUMENTS

| 6,230,266 | B1* | 5/2001 | Perlman | H04L 9/3268 |
| | | | | 713/156 |
| 7,404,203 | B2 | 7/2008 | Ng | |
| 7,685,206 | B1 | 3/2010 | Mathew et al. | |
| 8,935,751 | B1* | 1/2015 | Cardente | G06F 21/6218 |
| | | | | 709/229 |
| 2003/0204504 | A1* | 10/2003 | Stuy | G06F 17/30362 |
| 2004/0243827 | A1 | 12/2004 | Aguilera et al. | |
| 2006/0224590 | A1 | 10/2006 | Boozer et al. | |
| 2007/0100832 | A1 | 5/2007 | Klein | |
| 2010/0071029 | A1 | 3/2010 | Harald et al. | |
| 2010/0162370 | A1* | 6/2010 | Altay | G06F 21/335 |
| | | | | 726/5 |

(Continued)

FOREIGN PATENT DOCUMENTS

| CN | 101187901 A | 5/2008 |
| CN | 102117309 A | 7/2011 |

OTHER PUBLICATIONS

International Searching Authority, Appl. No. PCT/US2012/031403, filed Mar. 30, 2012,International Search Report pp. 9, mailed Nov. 28, 2012.

(Continued)

*Primary Examiner* — Kaveh Abrishamkar
*Assistant Examiner* — Thomas Ho
(74) *Attorney, Agent, or Firm* — Hewlett Packard Enterprise Patent Department (57) ABSTRACT

Example embodiments disclosed herein relate to implementing an authorization cache. An authorization fact is determined based on a grant. The authorization fact is cached. The grant is revoked. The authorization fact is revoked based on a grant index.

19 Claims, 5 Drawing Sheets

(56) References Cited

U.S. PATENT DOCUMENTS

| | | | |
|---|---|---|---|
| 2010/0235907 A1* | 9/2010 | Bowman | G06F 21/6218 726/21 |
| 2010/0242105 A1 | 9/2010 | Harris et al. | |
| 2012/0330925 A1* | 12/2012 | Ramamurthy | G06F 17/30448 707/718 |

OTHER PUBLICATIONS

Ionut Constandache et al., "Policy-driven Negotiation for Authorization in the Grid," Feb. 2006, pp. 1-9, Available at: <cs.uiuc.edu/homes/minami/papers/minami_thesis.pdf>.

Kazuhiro Minami, "Secure Context-sensitive Authorization," Thesis, Feb. 2006, pp. 1-157, Available at: <mcs.anl.gov/uploads/cels/papers/P1341.pdf>.

Supplementary European Search Report, Oct. 20, 2015, European Patent Application No. 12872471.3, 7 pages.

C. Ellison et al., "SPKI Certificate Theory," Sep. 1999, pp. 1-43, Network Working Group, Request for Comments: 2693, The Internet Society.

Carl M. Ellison et al., "Simple Public Key Certificate," Jul. 26, 1999, pp. 1-46, Internet Draft, IETF.

Carl M. Ellison et al., "SPKI Examples," Mar. 10, 1998, pp. 1-15, Internet Draft, IETF.

Dwaine Clarke et al., "Certificate Chain Discovery in SPKI/SDSI," Sep. 13, 2001, pp. 1-26.

Joseph Y. Halpern and Ron Van Der Meyden, "A Logical Reconstruction of SPKI," 2001, pp. 1-34, IEEE.

Ninghui Li and John C. Mitchell, "Understanding SPKI/SDSI Using First-Order Logic," Proceedings of the 16th IEEE Computer Security Foundations Workshop, Jul. 2003, pp. 1-27, IEEE.

R. Rivest, "S-Expressions," May 4, 1997, pp. 1-13, Network Working Group, Internet Draft, IETF.

* cited by examiner

AUTHORIZATION CACHE

BACKGROUND

Computing devices can use various services and/or resources from other devices. For example, computing devices can use storage resources, processing resources, etc. from other devices. An authorization approach can be implemented to determine whether the computing devices are authorized to use the resources and/or services.

BRIEF DESCRIPTION OF THE DRAWINGS

The following detailed description references the drawings, wherein.

DETAILED DESCRIPTION

Services and/or resources can be provided to clients. The infrastructure for implementing the authorization of services and/or resources can be based on a set of rules and grants. In certain examples, a resource is a physical or virtual component of limited availability in a computing system. Further, in certain examples, services, storage, network connections, memory areas, objects, etc. can be considered resources. Throughout the description, various examples are provided that are directed towards resources, however, other uses for authorization implementations are contemplated.

In some examples, resources can be implemented as a cloud computing infrastructure. For security purposes, the cloud computing infrastructure can restrict access to one or more of the resources to entities (e.g., users, devices, processes, etc.) that should be provided access to the respective resources. The infrastructure would determine whether the respective entity has authorization to use a particular resource or object that the entity requests access to. The authorization can be based on the requesting entity, the resource being accessed, and the operation or manner in which the calling entity wishes to use the resource. This can be accomplished by calling an authorization logic prover using a set of rules and grants of authority.

In certain embodiments, an authorization logic prover is a service that can be used to determine whether an entity E has an authorization A to perform a function (e.g., use, read, write, delete, etc.) with a resource R. Authorizations can be proved based on one or more queries based on one or more rules and/or one or more grants. In certain embodiments, a grant represents an allowance of authorization by an issuer to a subject. Grants can be stored in a database and may be used to prove that another subject should be provided authorization, for example, using one or more rules of prover authentication logic. In this scenario, the issuer can be a resource and/or another administrator associated with the resource. The subject can be an entity. The grant of authorization can be for the subject. Further, in certain scenarios, the grant of authorization can include delegation authority, for example, to be able to grant authorization and/or delegation authority to another entity. Rules can be used to determine whether an entity should receive authority based on grants.

The prover authentication logic can be called frequently (e.g., each time a resource is accessed, periodically, each time a session is created, etc.), thus it is desirable for the prover authentication logic to be efficient. Further, the results of authorization checks also should be up-to-date with the current set of grants to ensure proper security. Moreover, it would be desirable for the implementation to scale to support multiple entities and frequent updates.

Accordingly, various embodiments disclosed herein relate to caching facts about authorizations that are based on the rules and grants. To account for changes in grants, the authorization cache can be updated based on changes to grants. As such, a grant index can be maintained to keep track of grants that are used in proofs of authorization facts. In one example, the grants can be identified in the grant index using a hash of the Issuer of the grant, the Grant clause itself, and/or the Subject of the grant. In certain examples, the grant clause is a dataset of logic that identifies the type of grant (e.g., access type, access restrictions, delegation of authorization, read access, write access, modification access, combinations thereof, etc.). The grant index can associate grants with authorization facts that rely on them. As such, when a grant is revoked, the grant can be removed from the index and notify an authorization platform associated with the cache that the authorization facts should no longer be trusted. The authorization platform can then take actions based on the notification. In one example, the authorization is revoked. In another example, the authorization platform can attempt to reprove the authorization fact. In one scenario, the authorization fact is not proved and the authorization fact is revoked. In another scenario, the authorization fact can be proved using another set of grants and/or rules.

An example rule includes that an authorization query for whether a subject S has an authorization A from an issuer I can be proved if there is a direct grant from 1 to S of A. Another example rule is a self trust rule that an issuer I trusts itself. Further, delegation rules can apply. For example, if I authorizes a subject J with authorization A and J authorizes subject K with A, then the query can conclude that I authorizes K with A. As such, a query of hasAuth(I, K, A) can be proved if hasAuth(I, J, A) and hasAuth(J, K, A) are proved. These can be proved using grants. In these scenarios, hasAuth(Issuer, Subject, Authorization) can be a function or process that can be called to determine whether an Issuer authorizes a Subject with Authorization. The function can prove or disprove the query. Rules provided here are for example purposes, as such, additional or different rules may be created and/or used.

Further, if a group or name N is granted an authorization as a variable, then the members of the group or name also have authorization. As such, grants of authorization can be provided to groups, which may be considered variables during the proof. In one example, hasAuth(I, S, A) is proved if hasAuth(I, S, N) is true and hasAuth(I, N, A) is true, where N is the name of a group. Further, rules may include that an entity can confer groups belonging to the entity or confer a property belonging to the entity. As such, hasAuth(I, J, prop(J, . . . )) is proved based on a rule that properties are authorizations that may not have been delegated. Here, prop(J, . . . ) represents one or more properties about the owner (J). One or more of these rules and/or other rules can be applied to prove authorizations. In certain examples, properties can be something (e.g., a name, an identifier, a program's hash code, etc.) that is true about an issuer that cannot be delegated.

Figure 1A:
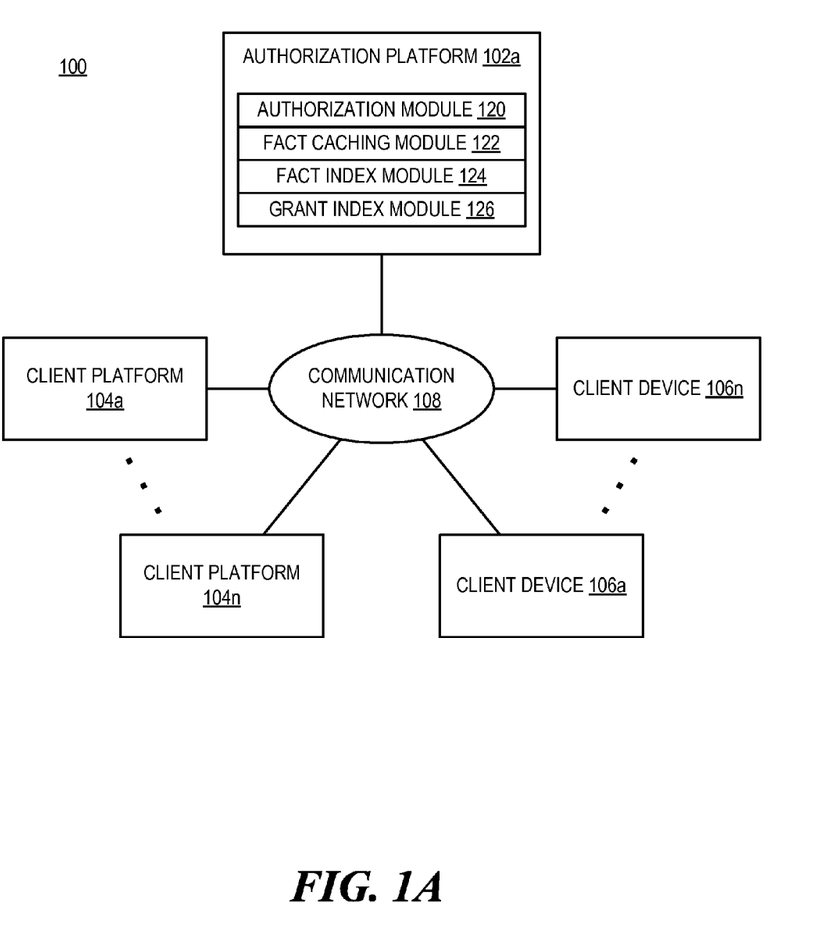
FIG. 1A is a block diagram of a computing system for implementing authorization of clients to use resources and/or services using a caching approach, according to one example.

FIG. 1A is a block diagram of a computing system for implementing authorization of clients to use resources and/or services using a caching approach, according to one example. The system 100 can include an authorization platform 102 that communicates with client platforms 104a-104n and/or client devices 106a-106n via a communication network 108. In certain examples, the authorization platform 102a, client platforms 104a-104n and/or the client devices 106a-106n are computing devices, such as servers, client computers, desktop computers, mobile computers, etc. In certain examples, the devices can be implemented via a processing element, memory, and/or other components.

Figure 1B:
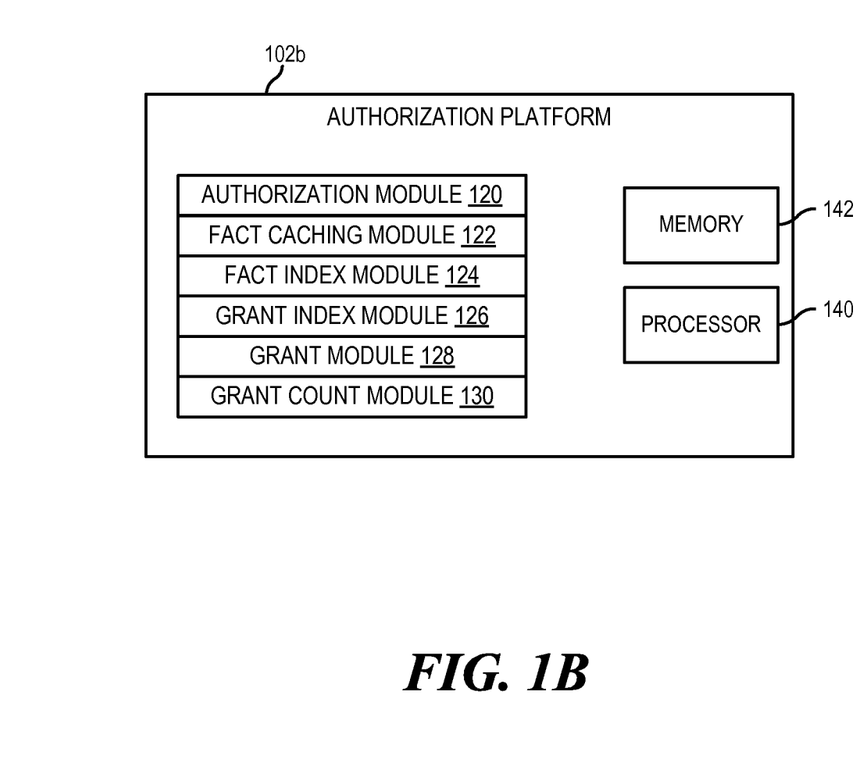
FIG. 1B is a block diagram of an authorization platform capable of determining authorization of clients to use resources and/or services using a caching approach, according to one example.

In one example, the authorization platform 102a includes an authorization module 120, a fact caching module 122, a fact index module 124, and a grant index module 126. In another example, as shown in FIG. 1B, authorization platform 102b can further include a grant module 128, a grant count module 130, a processor 140, and memory 142. As detailed herein, authorization platform 102 may determine authorization of clients to use resources and/or services using a caching approach. As noted, authorization platform 102 may be a server, a workstation, a notebook computer, or any other computing device capable of determining and caching authorization facts. Processor 140 may be a CPU, GPU, or microprocessor suitable for retrieval and execution of instructions and/or electronic circuits configured to perform the functionality of any of the modules 120-130 described herein. The client platforms 104 and client devices 106 can also include various modules that can be implemented by the execution of instructions and/or electronic circuits.

In certain examples, a client platform 104 is a device that can use authorization facts. Examples of client platforms 104 include devices that manage resources and/or services. As such, a client platform 104 may be, for example, a storage manager platform that facilitates access to one or more storage volumes. In other examples, the client platform 104 may be a resource manager that facilitates access processes, memory, processing power, etc.

In certain embodiments, an authorization fact represents a proved authorization for a subject, such as an entity requesting use of a resource. A proved authorization can include identification to one or more resources as well as a type of use (e.g., read access, write access, modification, connect, etc.). Further, a clause can represent logical rules. A proved authorization can be proved using prover authentication logic. Further, authorization facts can be stored in a cache using the fact caching module 124.

The authorization module 120 can be used to determine one or more authorization facts. Each of the authorization facts can be based on one or more grants that are respectively associated with a respective issuer to a respective subject. When an authorization fact is determined, the authorization fact can be indexed by an authorization term. As such, in certain examples, the authorization term is an identifier that can be used to identify the authorization fact. In certain examples, an authorization term can include an identifier about an issuer, the subject, and the authorization. The index can be implemented using a hashing approach. Moreover, in some examples, the issuer can be a manager of the resource, the subject can be an entity requesting use to the resource, and the authorization can include the type of use.

The authorization fact for the cache can be created when the authorization is proved. The authorization can be proved by a prover, for example, via a Prover class of a programming language such as Prolog. The prover can be a function, a class, or other process that can be executed by a processor to determine whether the subject has the particular authorization based on one or more grants. Further, the prover can be located at the authorization platform 102 and/or be implemented on another device and return information as to whether a query about a potential authorization fact is true. In one example, during the proof, the subject is a ground term that does not include any variables. As such, lookup by subject finds grants to the same subject. However, grants may include variables in the subject (for example, an issuer may grant access to a storage file to all users of a particular group, entities using a particular computing device, etc.). Thus, this type of indexing need not guarantee that a particular grant will be found. The prover can also generalize the subject by replacing subterms with variables (e.g., groups that the subject belongs to) before looking up grants. The prover can be part of client platform 104, authorization platform 102, or another device.

When an authorization fact is determined, the fact caching module 122 can cache the authorization fact. A list of grants used in the proof can be recorded and stored in a data structure (e.g., a list) in the resulting authorization fact. Authorization facts can be stored in a database and indexed. The authorization fact can also be added to a list in each grant that records the authorization facts depending on the respective grants. Further, the authorization facts can include a callback list that client platforms 104 can register with. As such, when an authorization fact has been revoked, the client platform 104 can be notified.

Moreover, the fact index module 124 can be used to implement a fact index that is indexed based on authorization facts. As noted, the authorization facts can be indexed by the authorization term. In certain embodiments, the index can be implemented using a hashing scheme, where the authorization term can be used as a key to lead to a part of the index. The fact index can include, for each authorization fact, information about the respective issuer, the respective subject, and the authorization.

The grant index module 126 can be used to implement a grant index for the grants. The grant index can include, for each grant, the respective issuer, the respective grant, and the respective subject. Hashtables can be used to implement use of the index. Further, in certain embodiments, the grants are hashed based on the issuer, the subject, and/or the grant clause itself.

A grant module 128 can be used to determine the existence of the grants. In one example, the grant module 128 can determine the existence of a grant by receiving authorizing information from an issuer or another trusted source. In certain embodiments, grants can be used as a distributed system. As such, in certain scenarios, when a grant is granted by an issuer, grant clause information can be sent to the authorization platform 102 to be stored in the grant index. In some embodiments, multiple grant modules 128 can be used. Further, the grant modules 128 can be implemented at various locations. For example, a resource or issuer providing a grant or manager facilitating access to a resource may include a module to create grants to grant authority to a subject. In another example, the grant module 128 can be located at the authorization platform 102. The authorization platform 102 can receive the information from the grant module 128 using, for example, a communication module (not shown). This information can be used to help implement the grant index.

When a grant is revoked, authorization facts based on the grant can also be revoked. In certain embodiments, a grant is considered revoked if each grant clause associated with the grant is no longer valid. When this occurs, the proof may fail, however, the authorization fact may still be true based on a different set of grants. As such, the fact caching module 122 can revoke authorization facts if a grant associated with the respective authorization fact is revoked.

In certain embodiments, a grant can be associated with multiple equivalent grant clauses. When a grant module 128 determines a grant, a grant count module 130 can determine whether that grant is equivalent to another one of the grants based on the associated grant clause. This can be done by the grant index module 126 looking up the grant clause using a hash of the grant clause. If the other grant is equivalent to this grant, a reference count associated with the other grant is incremented. If there is not an equivalent grant clause in the grant index, a new entry is made in the index, for example, in a hash table and the reference count value is set (e.g., set to 1). In certain embodiments, the two grants can be considered equivalent if the issuer, subject, and grant clause are the same. In certain examples, the subject can be a variable. If the subject is a variable, the two grants are considered equivalent if the variable in both subjects is the same.

When a grant module 128 determines to revoke a grant (e.g., this grant), the reference count associated with the equivalent grant is decremented by the grant index module 126. If when the grant clause is revoked, the respective reference count is reduced to a threshold value (e.g., 0), the grant can be considered revoked because it is indicative of each equivalent grant clause being revoked. An advantage of the reference counting is to ensure that equivalent grants are represented once in the index/hash tables. Further, the grant clause is retracted as many times as it is asserted before it is removed. The reference count can be used if an issuer provides the same grant multiple times (e.g., based on separate requests or logins).

When a grant is revoked, the grant can be deleted from the grant index. Further, when the grant is deleted, each authorization fact that is listed in the grant index as being dependent on the grant is also revoked. As noted, the grant index can include information about the authorization facts that are dependent upon the respective grants.

When the authorization fact is revoked, any clients, for example, client platforms 104 are notified using the callback list of clients. The client platforms 104 can then restrict access to the associated entities based on the notification.

Further, in certain embodiments, when the authorization fact is revoked, the prover can be implemented to determine if another proof is valid. This can occur if another chain of grants can be used to prove the authorization fact. In some examples, this can occur before the authorization fact is revoked. In other examples, this can occur after the authorization fact is revoked and the client platforms 104 are notified.

As detailed herein, authorization platform 102 may include a series of modules 120, 122, 124, 126, 128, 130 for revoking an authorization fact in a cache based on revocation of a grant. Each of the modules 120, 122, 124, 126, 128, 130 may include, for example, hardware devices including electronic circuitry for implementing the functionality described herein. In addition or as an alternative, each module may be implemented as a series of instructions encoded on a machine-readable storage medium, such as memory 142 and executable by processor 140. It should be noted that, in some embodiments, some modules are implemented as hardware devices, while other modules are implemented as executable instructions.

The communication network 108 can use wired communications, wireless communications, or combinations thereof. Further, the communication network 108 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network 108 can be in the form of a direct network link between devices. Various communications structures and infrastructure can be utilized to implement the communication network(s).

By way of example, the platforms and/or devices communicate with each other and other components with access to the communication network 108 via a communication protocol or multiple protocols. A protocol can be a set of rules that defines how nodes of the communication network 108 interact with other nodes. Further, communications between network nodes can be implemented by exchanging discrete packets of data or sending messages. Packets can include header information associated with a protocol (e.g., information on the location of the network node(s) to contact) as well as payload information.

Figure 2:
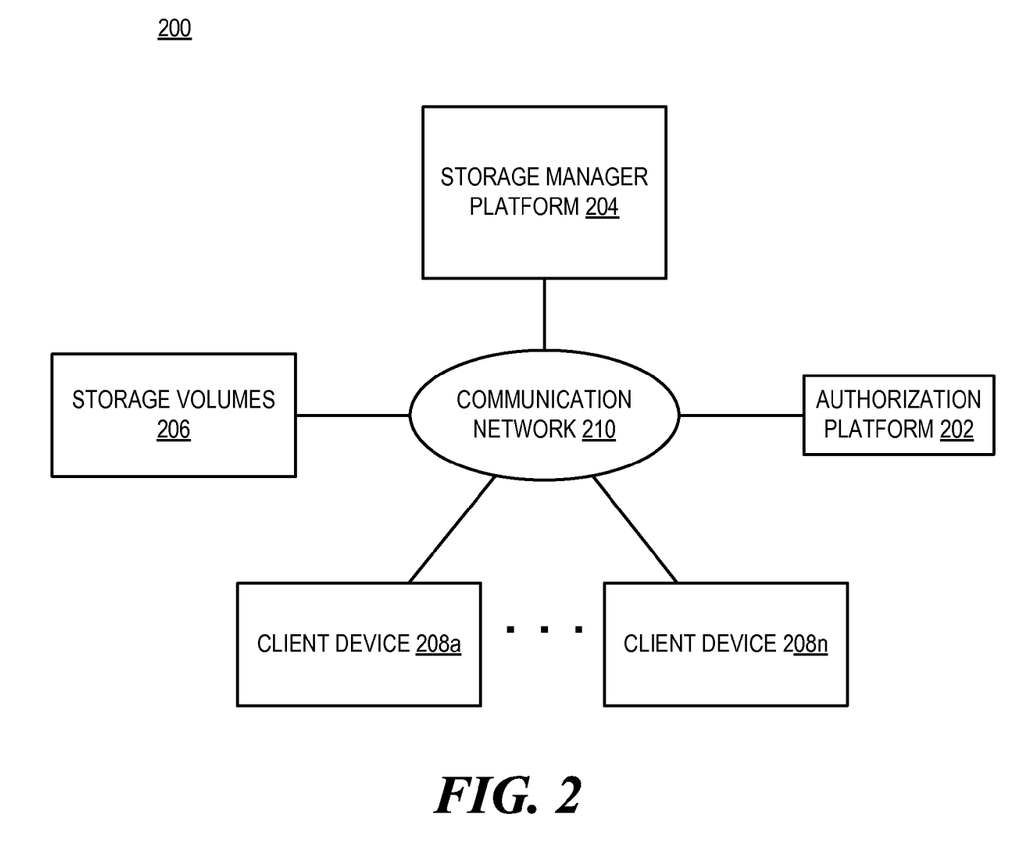
FIG. 2 is a block diagram of a computing system implementing authorization of clients to use storage based on a cached approach, according to one example.

FIG. 2 is a block diagram of a computing system implementing authorization of clients to use storage based on a cached approach, according to one example. In certain examples the system 200 can include an authorization platform 202 that communicates with a storage manager platform 204 to provide authorization information about storage volumes 206 to the storage manager platform 204. The storage manager platform 204 can use this information to facilitate access of the storage volumes to client devices 208a-208n. These devices may be connected via a communication network 210.

In certain examples, the authorization platform, storage manager platform 204, storage volumes 206 and the client devices 208 can be considered computing devices. In some examples, these devices can be implemented via a processing element, memory, and/or other components. Further, in one example, the storage volumes 206 is implemented using one or more storage drives (e.g., hard drives, solid state drives, etc.) and/or using one or more enclosures.

In this example, the storage manager platform 204 can be used to facilitate access to one or more storage volumes 206 to entities using client devices 208. In certain scenarios, entities can be provisioned cells of resources. In one embodiment, a cell can include a set of resources, for example, one or more storage volumes, processing capacity, etc. An entity on a client device 208a can be used to set up the cell. When the cell is set up, the resources, for example, a particular storage volume 206 can provide permission to the cell to use the storage volume 206, for example, by providing read access, write access, size manipulation access, etc. Moreover, the cell can grant use of the cell to the entity that created the cell. Further, in certain scenarios, the cell can provide other entities access, for example, an administrator, a maintenance program, etc. In certain scenarios, entities can be provided access to the storage volume 206 based on a chain of grants. For example, the storage volume 206 grants the cell usage, the cell grants the creating entity usage rights as well as delegation rights, the creating entity grants multiple groups of other entities read access, etc.

When an entity (e.g., a storage client) on a client device 208 wants to access the storage volume 206, the entity can request access from the storage manager platform 204. In certain embodiments, a storage client is a client that uses a storage resource. The storage manager platform 204 can determine authorization for the entity based on usage of an authorization module and/or authorization caching. For example, in certain embodiments, the storage manager platform 204 can include an authorization module, a fact caching module, a fact index module, and/or a grant index module locally. When authorization is requested, the authorization module can use a proof to determine whether the requesting entity has access. The subject of the proof can be the entity.

The authorization can be performed locally at the storage manager platform 204 and/or be requested from an authorization platform 202 located remotely. The storage manager platform 204 can maintain a cache of authorization facts. As such, in one embodiment, the authorization module of the storage manager platform 204 can determine authorization facts based on grants by querying the authorization platform 202 while maintaining the cache based on the authorization facts and information received about grants. When the proof is processed, the cache is updated to include the authorization fact. Further, the grant index can be updated to point to the authorization fact for each grant used in the proof. As such, as long as the authorization fact is valid, requests by the entity to use the storage volume 206 can be passed without need to query the authorization platform 202. This may be advantageous because the overhead of using the authorization platform 202 can be kept low when using the cache.

When one of the grants used in the proof is revoked, the storage manager platform 204 can be notified by a grant index module that the grant has been revoked. This information can be used to revoke the authorization fact. As noted, the authorization facts can include a list of clients, such as the storage manager platform 204, other storage manager platforms, etc. that can be called back when the authorization fact is revoked. The storage manager platform 204 receives the notification. Based on the notification, access to the storage volume can be revoked and/or limited. In certain scenarios, the revocation of an authorization fact can cause another full proof to be performed to determine if another set of grants can be used to prove that the subject should be provided access.

Figure 3:
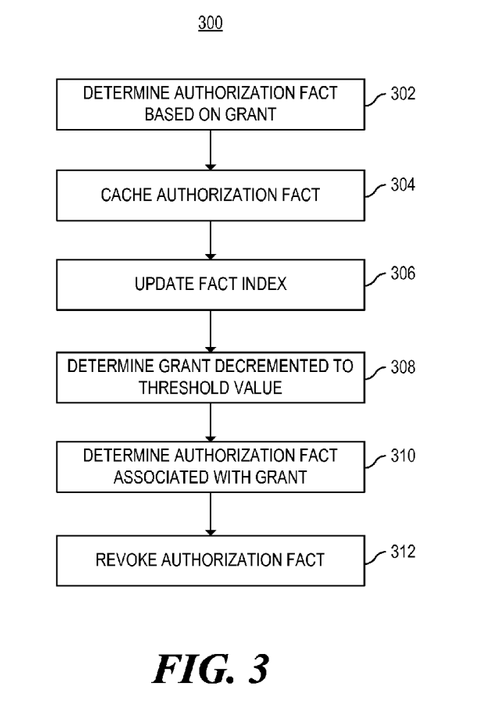
FIG. 3 is a flowchart of a method for revoking an authorization fact based on a caching model, according to one example.

FIG. 3 is a flowchart of a method for revoking an authorization fact based on a caching model, according to one example. Although execution of method 300 is described below with reference to authorization platform 102, other suitable components for execution of method 300 can be utilized (e.g., storage manager platform 204). Additionally, the components for executing the method 300 may be spread among multiple devices. Method 300 may be implemented in the form of executable instructions stored on a machine-readable storage medium and/or in the form of electronic circuitry.

Method 300 may start at 302, where authorization platform 102 determines an authorization fact based on one or more grants associated with a subject. As noted above, the authorization platform 102 can determine the authorization by executing a proof based on the grants and/or querying another device to perform the proof and receive the resulting authorization fact. A grant can be associated with a subject if the grant can be used to prove that the subject should be provided use of a resource. As noted above, a grant can include a variable in a subject field that can be used to associate with the subject.

At 304, the fact caching module 122 caches the authorization fact in an authorization fact database. A fact index module 124 can implement a fact index of other authorization facts. The fact index can include, for each of the authorization facts, a respective issuer (e.g., a resource such as a controller of a storage volume), a respective subject (e.g., a requestor for use of the resource), and a respective authorization (e.g., what the subject can do with the resource) and be used to index the authorization facts. In certain embodiments, an authorization term including the issuer, the subject, and the authorization can be used to index the authorization facts. In certain scenarios, when the authorization fact is cached, a client platform requesting use of the authorization fact can be added to a callback list. Further, as other client platforms use the authorization fact, they can be added to the callback list. Moreover, at 306, the fact index is updated with the authorization term of the proved authorization fact. The authorization term can include an identifier to the issuer associated with the authorization fact, the subject associated with the authorization fact, and the authorization clause of the authorization fact.

Further, a grant index associated with a plurality of grants may be maintained. For each grant, a set of dependent authorization facts is stored. For example, each of the grants associated with the proof of the authorization fact can identify the authorization fact. Moreover, as noted above, each grant can include an reference count. As such, when a grant with the same issuer, subject, and grant clause as another grant is added, the reference count is incremented. Similarly, when a grant clause is revoked by an issuer, the reference count associated with the index can be decremented.

In one example, at 308, the grant index module 126 determines that one of the grants has been decremented to a threshold value based on the grant index. Because the threshold has been reached, the grant can be removed from the grant index. Further, the fact caching module 122 can be notified about any authorization fact proved using the grant. In one embodiment, at 310, the grant index can be used to determine that the grant was used in the proof of the authorization fact. As such, the authorization fact is revoked at 312 by the fact caching module 122 based on the determination. As noted above, other processes can be implemented when an authorization fact is revoked, for example, attempting to reprove the authorization fact.

Figure 4:
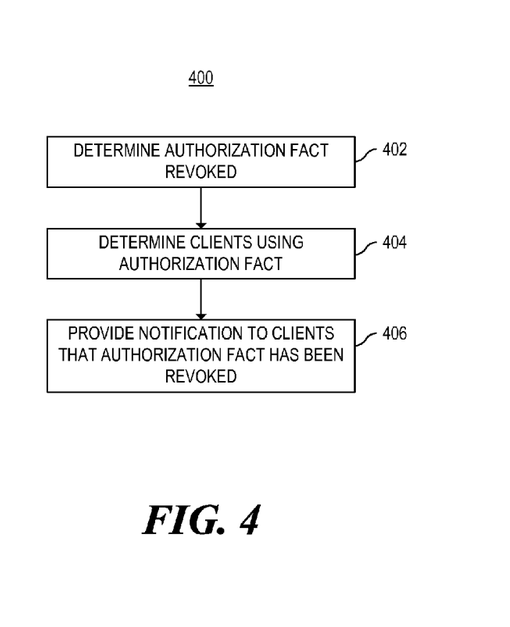
FIG. 4 is a flowchart of a method for providing notification to a client that an authorization fact has been revoked, according to one example.

FIG. 4 is a flowchart of a method for providing notification to a client that an authorization fact has been revoked, according to one example. As with FIG. 3, although execution of method 400 is described below with reference to authorization platform 102, other suitable components for execution of method 400 can be utilized (e.g., storage manager platform 204). Additionally, the components for executing the method 400 may be spread among multiple devices. Method 400 may be implemented in the form of executable instructions stored on a machine-readable storage medium and/or in the form of electronic circuitry.

At 402, a fact caching module 122 determines that an authorization fact has been revoked, for example, based on the revocation of a grant supporting the authorization fact. In response to the determination that the authorization fact has been revoked, the fact caching module 122 and/or fact index module 124 determines clients using the authorization fact at 404. The determination can be based on parsing the authorization fact. In certain scenarios, clients can be associated with a callback list associated with the authorization fact. The callback list can include information that can be used to generate a notification to the respective clients. The callback list can be associated with the authorization fact in a fact index.

Then, at 406, an authorization platform 102 can provide a notification to each of the clients that the authorization fact has been revoked. In certain examples, the clients can be client platforms 104, storage managers or clients, etc. As noted above, in one example, one of the clients is a storage manager that uses the authorization fact to determine whether a storage client should be provided access to a storage volume. In this scenario, the storage client is the subject of the authorization fact.

Figure 5:
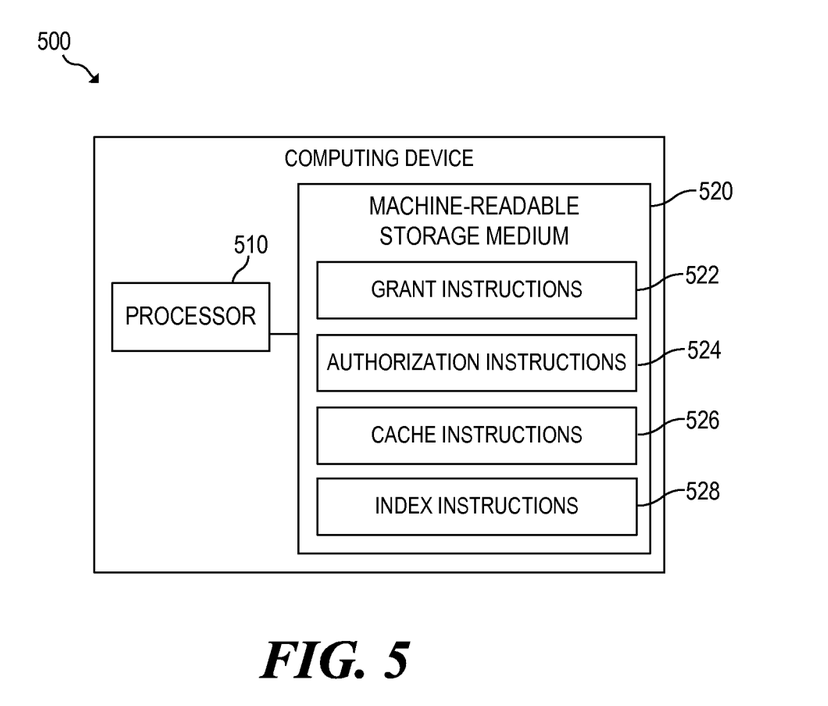
FIG. 5 is a block diagram of a computing device capable of determining authorization of resources to clients using a fact caching approach, according to one example.

FIG. 5 is a block diagram of a computing device capable of determining authorization of resources to clients using an authorization fact caching approach, according to one example. The computing device 500 includes, for example, a processor 510, and a machine-readable storage medium 520 including instructions 522, 524, 526, 528 for determining whether to revoke an authorization fact. Computing device 500 may be, for example, a notebook computer, a slate computing device, a server, a desktop computer, a workstation, or any other computing device.

Processor 510 may be, at least one central processing unit (CPU), at least one semiconductor-based microprocessor, at least one graphics processing unit (GPU), other hardware devices suitable for retrieval and execution of instructions stored in machine-readable storage medium 520, or combinations thereof. For example, the processor 510 may include multiple cores on a chip, include multiple cores across multiple chips, multiple cores across multiple devices (e.g., if the computing device 500 includes multiple node devices), or combinations thereof. Processor 510 may fetch, decode, and execute instructions 522, 524, 526, 528 to implement the methods of FIGS. 3 and 4. As an alternative or in addition to retrieving and executing instructions, processor 510 may include at least one integrated circuit (IC), other control logic, other electronic circuits, or combinations thereof that include a number of electronic components for performing the functionality of instructions 522, 524, 526, 528.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 520 may be encoded with a series of executable instructions for determining whether to revoke an authorization fact based on the revocation of a grant.

The grant instructions 522 can be executed to determine grants. In certain examples, determining a grant means issuing a grant or receiving information about an issued grant of authority. As noted above, a grant can be considered a grant of authorization by an issuer to a subject. In certain scenarios, the subject of a grant can be a variable. For example, the subject can be a group or set of other entities. Index instructions 528 can be used to implement indexes to manage authorizations. In one example, the index instructions 528 can be executed to implement a grant index. In another example, the index instructions 528 can be executed to implement an authorization fact index.

An entity can request the computing device 500 to facilitate access to a resource. The authorization instructions 524 can be executed to determine an authorization fact based one or more grants. The grants can each be respectively associated with a respective issuer and a respective subject. Further, the authorization fact is proved using a prover. In this scenario, an authorization fact is proved for the entity to use the resource with a particular authorization. In one example, the computing device 500 performs the proof. In another example, the computing device 500 can request the proof of the authorization fact from another device.

The cache instructions 526 can be executed to cache the authorization fact in an authorization fact database. In certain embodiments, the authorization fact database can also be indexed using the index instructions 528. As such, the authorization fact index can be updated with the authorization fact. The index can be indexed using an authorization fact term. As such, a fact index entry can be created corresponding to the authorization fact that includes the respective subject, the respective issuer, and the respective authorization.

Later, the processor 510 can determine, based on the grant index, that one of the grants of the stored in the grant index has been revoked. When the grant is revoked, authorization facts using the grant are identified (e.g., based on authorization term). The cache instructions 526 can then be executed to determine whether to revoke an authorization fact based on the revocation of the grant. In one example, the revoked grant is associated with the created authorization fact. As such, the authorization fact is revoked.

When the authorization fact is revoked, one or more client platforms associated with the authorization fact is determined based on a callback list associated with the authorization fact. A notification can be generated and sent to the client platform(s) that the authorization fact has been revoked. The client platforms can use this information when deciding what entities should be provided use of the respective resources.

As noted above, in one example, the client platform can be a storage manager providing access authorization to a storage client. The storage client can be considered the subject. The authorization term that is proved in this case can be that the storage client is provided a particular access authorization to use an issuing storage volume.

Further, as noted above, the grant index can be implemented to account for a reference count of how many equivalent grants are used. As such, the grant index can include information about each grant's respective issuers, subjects, the grant clause itself, and the associated reference count. The reference count can be incremented when an equivalent grant is issued and decremented when an equivalent grant is revoked. Further, when the reference count is decremented to a threshold, the grant can be deleted from the index. This can start the process of informing the cache that associated authorization facts may no longer be valid because the grant is no longer valid.

What is claimed is:

1. A computing system comprising:
   a hardware processor and instructions executed by the hardware processor to:

determine a plurality of authorization facts each based on a plurality of grants respectively associated with a respective issuer to a respective subject;
cache the authorization facts;
maintain a fact index based on the authorization facts, and an authorization term for each respective authorization fact;
maintain a grant index of the plurality of grants, wherein the grant index includes for each grant among the plurality of grants:
the respective issuer, the respective grant, and the respective subject; and
a reference count representing an amount of equivalent grants, wherein an equivalent grant includes a grant having a same issuer, a same grant clause, or a same subject;
revoke one of the authorization facts in response to a grant among the plurality of grants being revoked, wherein the authorization fact is based on the revoked grant;
determine whether a client device should be provided access to a resource, using the authorization fact, wherein the client device is the subject of the authorization fact; and
notify the client device of the determination.

2. The computing system of claim 1, wherein the computing device further comprises instructions executed by the hardware processor to:
determine a first grant; and
determine whether the first grant is equivalent to a second grant among the plurality of grants, wherein if the first grant is equivalent to the second grant, the reference count respectively associated with the first grant is incremented.

3. The computing system of claim 1, wherein the computing device further comprises instructions executed by the hardware processor to:
determine to revoke a first grant that is an equivalent grant to a second grant among the plurality of grants and decrement the reference count associated with the first grant.

4. The computing system of claim 1, wherein the computing device further comprises instructions executed by the hardware processor to:
determine to revoke a first grant that is an equivalent grant to a second grant among the plurality of grants, and in response to a determination that the second grant has been revoked because a reference count associated with the second grant is reduced to a threshold level.

5. The computing system of claim 1, wherein an authorization fact among the plurality of authorization facts is associated with a callback list of client devices, wherein when the authorization fact is revoked, each of the client devices on the callback list is notified.

6. The computing system of claim 5, wherein one of the client devices is a storage manager.

7. The computing system of claim 6, wherein the storage manager removes access to the resource based on the notification.

8. A non-transitory machine-readable storage medium storing instructions that, if executed by a hardware processor, cause hardware processor to:
determine an authorization fact based on a plurality of grants each respectively associated with a respective issuer and a respective subject;
cache the authorization fact in an authorization fact database;
update a fact index including a plurality of other authorization facts with the authorization fact, wherein a fact index entry corresponding to the authorization fact includes the respective subject and the respective issuer;
determine, based on a grant index including a reference count representing an amount of equivalent grants for each of the respective grants, that one of the grants among the plurality of grants has been revoked, wherein an equivalent grant includes a grant having a same issuer, a same grant clause, or a same subject;
determine whether to revoke the authorization fact based on the revocation of the one grant;
determine whether a client device should be provided access to a resource, using the authorization fact, wherein the client device is the subject of the authorization fact; and
notify the client device of the access determination.

9. The non-transitory machine-readable storage medium of claim 8, further comprising instructions that, if executed by the hardware processor, cause the hardware processor to:
determine the client device associated with the authorization fact based on a client callback list; and
send the client device a notification that the authorization fact has been revoked.

10. The non-transitory machine-readable storage medium of claim 8, wherein the client device is a storage manager.

11. The non-transitory machine-readable storage medium of claim 8, further comprising instructions that, if executed by the hardware processor, cause the hardware processor to:
determine whether the one grant has been revoked based on the reference count included in the grant index.

12. A method comprising:
determining an authorization fact based on a plurality of grants, each of the plurality of grants respectively associated with a respective subject;
caching the authorization fact in an authorization fact database, wherein a fact index includes, for each of a plurality of authorization facts:
a respective issuer;
a respective subject; and
a respective authorization
updating the fact index using an authorization term,
maintaining a grant index that is associated with the plurality of grants, wherein the grant index stores for each grant among the plurality of grants:
an equivalency count using a hash of the respective issuer of the grant;
a grant clause associated with the grant; and
the subject of the grant;
determining, using the grant index, that a grant among the plurality of grants has been decremented to a threshold value;
revoking the authorization fact based on a determination that an authorization fact from which the authorization fact depends has been revoked;
determining, using the authorization fact, whether a client device should be provided access to a resource, wherein the client device is the subject of the authorization fact; and
notifying the client device of the access determination.

13. The method of claim 12, wherein the authorization fact is associated with a callback list of one or more client devices.

14. The method of claim 13, further comprising:
notifying each of the one or more client devices that the authorization fact has been revoked.

15. The method of claim 13, wherein one of the one or more client devices is a storage manager that serves a storage client.

16. The method of claim 12, wherein each of the plurality of grants is associated with a grant clause comprising instructions that identify a type of grant selected from the group of:
- an access type;
- an access restriction;
- a read access;
- a write access; and
- a modification access.

17. The method of claim 16, further comprising:
determining whether a first grant among the plurality of grants is equivalent to a second grant among the plurality of grants by:
looking up a hash of the grant clause of the first grant in the grant index; and
determining if the grant clause of the first grant is equivalent to the grant clause of the second grant.

18. The method of claim 17, further comprising:
generating a new entry in the grant index corresponding to the second grant in response to determining that the grant clause of the first grant is not equivalent to the grant clause of the second grant.

19. The method of claim 12, further comprising removing a grant from the grant index in response to a determination that the grant has been revoked.

\* \* \* \* \*